United States Patent Office 2,902,490
Patented Sept. 1, 1959

2,902,490

4-(1,5-IMINOCYCLOALKYL) - 1 - ALKYL-1,2,4,5-TETRAHYDRO-1,4-BENZODIAZEPINES AND PREPARATION THEREOF

Sydney Archer, Bethlehem, N.Y., assignor to Sterling Drug Inc., New York, N.Y., a corporation of Delaware No Drawing. Application August 9, 1957
Serial No. 677,197

16 Claims. (Cl. 260—292)

The inventive contribution described herein is the novel group of chemical compounds obtained by the attachment to a 1,5-imino N-substituted cycloalkane at the 3-position thereof, through an intervening polyvalent non-metallic atom, of a basic-tertiary-amino-alkylene group and the procedure whereby this is accomplished.

The cycloalkane above is preferably cycloheptane or cyclooctane and among the substituents on the nitrogen atom of the 1,5-imino bridge are hydrocarbon radicals or such radicals bearing substituents such as halo, alkyl, alkoxy, et cetera. The said radical preferably has from 1 to about 10 carbon atoms. The polyvalent non-metallic atom serving to connect the cycloalkane and the tertiary-amino-alkylene group is preferably nitrogen, oxygen, or sulfur. The basic-tertiary-amino-alkylene group is a nitrogen atom to which there is attached an alkylene radical and the other two valences are satisfied by two organic radicals which may be linked to form a ring including the tertiary-amino nitrogen atom.

A particular aspect of the invention relates to tertiary-amino-substituted tropanes and granatanines and salts thereof, said tropanes and granatanines having the general formula:

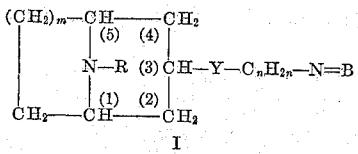

I wherein Y is a divalent radical selected from the group consisting of NH, N(lower-alkyl), N(lower-alkanoyl), N(monocarbocyclic aroyl), N(lower-alkylcarbamyl), N(lower-alkenylcarbamyl), N(monocarbocyclic arylcarbamyl), N(lower-alkylthiocarbamyl), N(lower-alkenylthiocarbamyl) and N(monocarbocyclic arylthiocarbamyl), $n$ is an integer from 2 to 6, $m$ is an integer from 1 to 2, R is a member of the group consisting of lower-alkyl, monocarbocyclic aryl-lower-alkyl, and monocarbocyclic aryl, and N=B is a tertiary-amino group selected from the class consisting of di-lower-alkylamino, 1-piperidyl, 1-pyrrolidyl, 4-morpholinyl, monocarbocyclic aryl-lower-alkylamino, and groups having the structure:

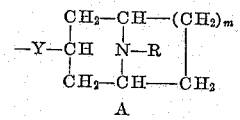

A

The invention also relates to methods for preparing said new tertiary-amino-substituted tropanes and granatanines.

Pharmacological evaluation of the compounds of the invention by the standard carotid occlusion response in dogs and the nictitating membrane response in cats has shown that these substances have ganglionic blocking effects and indicates usefulness for the compounds in the field of reducing hypertension. The quaternary ammonium salts are particularly potent ganglionic blocking agents, although the free bases and acid-addition salts also possess ganglionic blocking action but larger doses are required than for the quaternary ammonium salts.

In the above general formula I, the tertiary-amino radical N=B includes di-lower-alkylamino, saturated N-heterocyclic groups, such as 1-piperidyl, 1-pyrrolidyl, 4-morpholinyl, and lower-alkylated derivatives thereof (for example, 2-methyl-1-piperidyl, 3-ethyl-1-pyrrolidyl, 3-methyl-4-morpholinyl, and the like), and lower alkyl-arylamino groups wherein the aryl group is a monocarbocyclic aryl group. The term lower-alkyl includes alkyl radicals containing from one to about six carbon atoms, and in the di-lower-alkylamino radicals the lower-alkyl groups can be the same or different. Thus N=B, when it represents a di-lower-alkylamino radical, includes such groups as dimethylamino, diethylamino, ethylmethyl-amino, dipropylamino, dibutylamino, dipentylamino and dihexylamino.

The term monocarbocyclic aryl refers to a radical of the benzene series and includes such groups as phenyl and phenyl substituted by inert substituents such as lower-alkyl, lower-alkoxy and halogen. Thus N=B, when it represents a lower-alkyl-arylamino group, includes such groups as methylphenylamino, N(CH$_3$)(C$_6$H$_5$); ethyl-phenylamino, N(C$_2$H$_5$)(C$_6$H$_5$); methyl-4-chlorophenyl-amino, N(CH$_3$)(C$_6$H$_4$Cl-4); methyl-3-methoxyphenyl-amino, N(CH$_3$)(C$_6$H$_4$OCH$_3$-3); methyl-2-methylphenyl-amino, N(CH$_3$)(C$_6$H$_4$CH$_3$-2); isopropylphenylamino, N(C$_3$H$_7$)(C$_6$H$_5$); butylphenylamino, N(C$_4$H$_9$)(C$_6$H$_5$); hexylphenylamino, N(C$_6$H$_{13}$)(C$_6$H$_5$); and the like. In the preferred types of lower-alkyl-arylamino groups, the lower-alkyl groups have from one to about six carbon atoms, and the aryl group is unsubstituted phenyl or phenyl substituted by from one to three lower-alkyl, lower-alkoxy, or halogen radicals, in which the lower-alkyl and lower-alkoxy radicals have from one to about six carbon atoms, and halogen is selected from fluorine, chlorine, bromine and iodine. The term lower-alkoxy is also intended to include the methylenedioxy group, —OCH$_2$O—, which, although divalent, can be readily classed with the monovalent alkoxy groups on the basis of its chemical properties. If more than one substituent is present in the phenyl ring they can be the same or different.

In the above general formula I, R represents a lower-alkyl, aralkyl or monocarbocyclic aryl group. The lower-alkyl groups can be straight or branched and contain from one to about six carbon atoms. The aralkyl groups are monocarbocyclic aryl-lower-alkyl groups in which the monocarbocyclic aryl groups are the same type as described above. Accordingly R represents such groups as methyl, ethyl, propyl, isopropyl, butyl, isobutyl, tertiary-butyl, pentyl, hexyl, benzyl, 2-phenylethyl, 3-phenyl-propyl p-chlorobenzyl, m-methoxybenzyl, p-methylbenzyl, phenyl, o-bromophenyl, p-ethoxyphenyl, p-tolyl and the like.

Referring to the above general formula I, the compounds where $m$ is 1 belong to the tropane series whereas the compounds where $m$ is 2 belong to the granatanine series. In these compounds there is a possibility of stereoisomerism depending upon whether the side chain, —Y—C$_n$H$_{2n}$—N=B is on the same side or the opposite side of the molecule as the substituent R. In the tropane series these stereoisomers are known as tropanes and pseudotropanes, respectively.

The 1,5-iminocycloalkanes of the invention wherein the tertiary-amino-lower-alkylene group is attached by NH to the 3-position are prepared by condensing a 1,5-imino-cycloalkan-3-one having a hydrocarbon radical attached to the imino nitrogen with a tertiary-amino-lower-alkyl-amine, and reducing the resulting imine by catalytic hydrogenation or by chemical means, for example with sodium in the presence of a lower-alkanol.

The compounds of formula I where Y is NH can be prepared by condensation of a compound having the formula

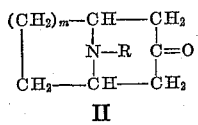

II with a tertiary-aminoalkylamine, $H_2N-C_nH_{2n}-N=B$, under catalytic hydrogenation conditions. The condensation and reduction take place at room temperature, although heat may be applied if desired. It is convenient to employ a liquid organic reduction medium, such as ethyl alcohol, which is unreactive with the compound II and tertiary-aminoalkylamine and is not subject to catalytic hydrogenation. Exemplary of the tertiary-aminoalkylamines which can be used are 2-diethylaminoethylamine, $(C_2H_5)_2NCH_2CH_2NH_2$; 3-dimethylaminopropylamine, $(CH_3)_2NCH_2CH_2CH_2NH_2$; 2-(1-piperidyl)propylamine, $C_5H_{10}NCH(CH_3)CH_2NH_2$; 5-(1-pyrrolidyl)pentylamine, $C_4H_8NCH_2CH_2CH_2CH_2CH_2NH_2$; 2 - phenylmethylaminoethylamine, $C_6H_5(CH_3)NCH_2CH_2NH_2$; and the like.

The compounds of Formula II are readily prepared by the classic Robinson synthesis, i.e., condensation of succindialdehyde or glutaric dialdehyde with a primary amine and an acetone dicarboxylic acid ester, followed by hydrolysis and decarboxylation, according to the following equation:

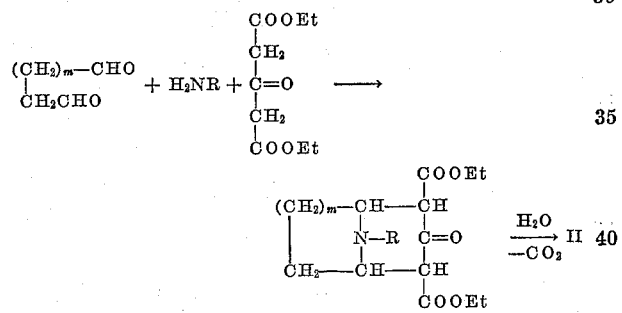

The succindialdehyde ($m$ is 1) is conveniently prepared in situ by acid treatment of 2,5-diethoxytetrahydrofuran. The glutaric dialdehyde is conveniently prepared in situ by heating glutaric dialdehyde dioxime with sodium nitrite in hydrochloric acid.

The compounds of Formula I where Y is NH can also be prepared by condensation of a compound of Formula II and $H_2N-C_nH_{2n}-N=B$ in the presence of a dehydrating agent, such as zinc chloride, to give an unsaturated intermediate of the structure

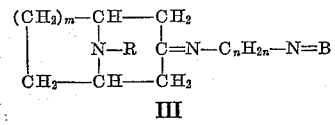

III followed by reduction of the latter either catalytically or chemically, for example, by means of sodium in the presence of a lower-alkanol. Catalytic hydrogenation gives substantially exclusively one stereoisomer, belonging to or analogous to the normal tropane series. Sodium-alcohol reuction, however, usually yields a mixture of stereoisomers.

A method for preparing compounds of Formula I where Y is $N(CH_3)$ comprises heating compounds where Y is NH with formaldehyde and formic acid. However, when a cycloalkane compound having a 1,5-imino bridge, a hydrocarbon radical attached to the imino nitrogen and a 2-(monocarbocyclic aryl-lower-alkylamino)ethylamino group attached to the 3-position of the cycloalkane ring is heated with formaldehyde and formic acid, instead of the corresponding compounds wherein the center nitrogen atom is methylated, there is obtained a cycloalkane compound having a 1,5-imino bridge, a hydrocarbon radical attached to the imino nitrogen and a 1-alkyl-1,2,4,5-tetrahydro-1,4-benzodiazepine radical attached to the 3-position of the cycloalkane ring through the nitrogen atom in the 4-position of the diazepine ring. These compounds are also within the purview of my invention. A particular aspect of the invention relates to compounds having the formula

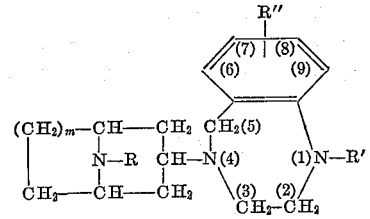

IV

The compounds of Formula IV are 1-alkyl-4-(3-tropanyl or -granatanyl) - 1,2,4,5 - tetrahydro - 1,4 - benzodiazepines, wherein $m$ and R have the same meanings as given previously, R′ represents a lower-alkyl group having from 1 to about 6 carbon atoms, and R″ represents hydrogen or a lower-alkyl or lower-alkoxy group, said lower-alkyl or lower-alkoxy group having from 1 to about 6 carbon atoms. The compounds of Formula IV are prepared by heating the compounds of Formula I wherein Y is NH, $n$ is 2, and $N=B$ is an aryl-lower-alkylamino group, wherein the aryl group is phenyl or phenyl substituted by lower-alkyl or lower-alkoxy groups, with formaldehyde and formic acid. Like the compounds of Formula I, the compounds of Formula IV are useful as ganglionic blocking agents.

The azepine structure was proved by Hofmann degradation studies. Hofmann degradation of the compound believed to be 1-methyl-4-(3-tropanyl)-1,2,4,5-tetrahydro-1,4-benzodiazepine [IV; R′ is $CH_3$, $m$ is 1, R is $CH_3$, R″ is H] bismethiodide gave a product which formed a dipicrate and which gave carbon and hydrogen analytical values in agreement with 1-[(2-dimethylaminobenzyl)-vinylamino]-3-dimethylamino-5-cycloheptene having the structure

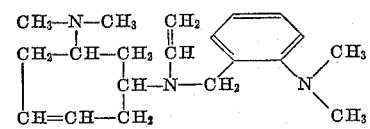

which would be expected from degradation of the azepine structure. If, on the other hand, the starting material were 3 - [(2 - phenylmethylaminoethyl)methylamino]-tropane [I; Y is $N(CH_3)$, $n$ is 2, $m$ is 1, R is $CH_3$, $N=B$ is $N(CH_3)(C_6H_5)$] bismethiodide, the Hofmann degradation would give dimethylaniline and a compound of the structure

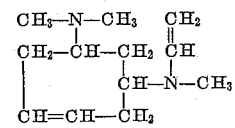

The latter structure would only form a monopicrate since vinyl amines do not readily form picrates. In view of the analytical data, and the facts that a dipicrate was obtained and no dimethylaniline could be detected, the azepine structure was established. Further evidence of the diazepine structure was obtained from the fact that analysis for N-methyl groups showed that the molecule contained two N-methyl groups whereas the open chain compound, 3 - [(2 - phenylmethylaminoethyl)methylamino]tropane, would contain three N-methyl groups.

The new tertiary-amino-aliphatic substituted tropanes and granatanines of Formulas I and IV are most conveniently used in the form of water-soluble, non-toxic acid-addition or quaternary ammonium salts. Non-toxic salts are salts whose anions are relatively innocuous to the animal organism in therapeutic doses of the salts, so that beneficial physiological properties inherent in the free bases are not vitiated by side effects ascribable to the anions; in other words, the latter do not substantially increase the toxicity inherent in the cations. Appropriate acid-addition salts are those derived from mineral acids such as hydrochloric acid, hydrobromic acid, hydriodic acid, nitric acid, sulfuric acid and phosphoric acid; and organic acids such as acetic acid, citric acid, lactic acid, and tartaric acid. The quaternary ammonium salts are obtained by the addition of alkyl, alkenyl or aralkyl esters of inorganic acids or organic sulfonic acids to the free base form of the compounds. The alkyl, alkenyl or aralkyl esters so used include such compounds as methyl chloride, methyl bromide, methyl iodide, ethyl bromide, propyl chloride, allyl chloride, allyl bromide, methyl sulfate, methyl benzenesulfonate, methyl p-toluenesulfonate, benzyl chloride, benzyl bromide, and substituted benzyl halides, such as p-chlorobenzyl chloride, p-nitrobenzyl chloride, o-chlorobenzyl chloride, p-methoxybenzyl chloride, p-methylsulfonylbenzyl bromide, and the like.

The acid-addition salts are prepared either by dissolving the free base in an aqueous solution containing the appropriate acid and isolating the salt by evaporating the solution, or by reacting the free base and acid in an organic solvent, in which case the salt separates directly or can be obtained by concentration of the solution. The number of equivalents of acid which enter into salt formation depends upon the amount of acid present and the number of amino groups present in the free base. If an excess of acid is used, the number of equivalents of acid entering into salt formation will be equal to the number of basic nitrogens present in the free base.

The quaternary ammonium salts are prepared by mixing the free base and the alkyl, alkenyl or aralkyl esters in an organic solvent. Heating may be used to facilitate the reaction, although salt formation usually takes place readily at room temperature. The quaternary ammonium salt separates directly or can be obtained by concentration of the solution. The number of equivalents of alkyl halide or other ester entering into salt formation depends upon the amount of ester present relative to the amount of free base, and on the number of tertiary-amino groups present in the free base. The number of tertiary-amino groups present in the free base may vary from two, where Y is NH, to four, where Y is N(lower-alkyl) and N=B has Formula A. If an excess of alkyl halide or other ester is used, some or all of the tertiary-amino groups present in the free base may be quaternized, depending upon reaction conditions such as time and temperature. In compounds of Formula I where Y is NH, N(acyl) or N(lower-alkyl) and where N=B is dialkylamino, piperidyl, pyrrolidyl, morpholinyl or phenyl-lower-alkylamino, bis-quaternary salts are most often produced, probably involving the nitrogen atoms of the nucleus and N=B. In some cases, however, where Y is N(lower-alkyl) tris-quaternary salts are obtained, and mixtures of salts having different degrees of quaternization are sometimes produced.

The quaternary ammonium salts of my invention can be represented by the formula $Z \cdot (R'''X'')_{n'}$, wherein Z stands for an amine of Formulas I or IV, R''' stands for a hydrocarbon radical, X'' stands for an anion, and $n'$ is an integer from 1 to 4 depending upon the number of quaternizable centers in the amine Z and the conditions under which the quaternization reaction takes place. Preferred types of the hydrocarbon group R''' are those having from one to about ten carbon atoms selected from lower-alkyl, lower-alkenyl and monocarbocyclic aryl-lower-alkyl groups in which the aryl groups can be substituted by inert substituents such as lower-alkyl, lower-alkoxy, halo and nitro.

The quaternary ammonium salts are prepared by reacting the amine Z with a compound R'''X'' where X'' is the anion of a strong acid. It is also possible to convert one quaternary ammonium salt to another in which the anion X'' is different. If the anion X'' of the quaternary salt forms a water-insoluble silver salt, the quaternary salt will react with silver oxide in aqueous medium to form the corresponding quaternary ammonium hydroxide. The latter can then be neutralized with any desired acid, weak or strong, to produce a new quaternary ammonium salt in which the anion is different from that of the original quaternary salt. In this way quaternary ammonium salts in which the anion X'' is derived from a weak acid can be obtained.

The following examples will further illustrate the invention.

Example 1

(a) 3-(2-phenylmethylaminoethylamino)tropane [I; Y is NH, $n$ is 2, $m$ is 1, R is $CH_3$, N=B is $N(CH_3)(C_6H_5)$].

A mixture of 51.5 g. of 3-tropanone, 50.6 g. of N-methyl-N-phenylethylenediamine, 2 g. of platinum oxide catalyst and 56 ml. of anhydrous ethyl alcohol was shaken in a hydrogen atmosphere at an initial pressure of 50 lbs. per sq. inch. After one mole of hydrogen had been absorbed, the reaction mixture was filtered, and the filtrate was concentrated and distilled, giving 27.2 g., B.P. 157–171° C. (0.1 mm.) which was redistilled to give 3-(2-phenylmethylaminoethylamino)tropane, B.P. 167–173° C. (0.1 mm.).

(b) 1 - methyl - 4 - (3 - tropanyl) - 1,2,4,5 - tetrahydro-1,4-benzodiazepine [IV; R' is $CH_3$, $m$ is 1, R is $CH_3$, R'' is H].

A solution of 26.5 ml. of 98% formic acid in 500 ml. of water was added to 29 g. of 3-(2-phenylmethylaminoethylamino)-tropane. Formaldehyde (10 ml. of 37% solution) was added, and the mixture was heated on a steam bath for about fifteen hours. The ether mixture was concentrated and the residue was dried azeotropically and distilled, giving 10 g. of 1-methyl-4-(3-tropanyl)-1,2,4,5-tetrahydro-1,4-benzodiazepine, B.P. 155–165° C. (0.6 mm.).

(c) 1 - methyl - 4 - (3 - tropanyl) - 1,2,4,5 - tetrahydro-1,4-benzodiazepine bismethiodide was prepared from a solution of 7.5 g. of 1-methyl-4-(3-tropanyl)-1,2,4,5-tetrahydro-1,4-benzodiazepine [part (b) above] and 8.16 g. of methyl iodide in 35 ml. of anhydrous ethanol, kept overnight at room temperature. The crystalline product which separated was recrystallized from water giving 5.2 g. of 1-methyl-4-(3-tropanyl)-1,2,4,5-tetrahydro-1,4-benzodiazepine bismethiodide, M.P. 264–267° C. (dec.).

*Analysis.*—Calcd. for $C_{20}H_{33}N_3I_2$: N, 7.38; I, 44.59; $N(CH_3)$, 10.5. Found: N, 7.46; I, 44.20; $N(CH_3)$, 10.4.

HOFMANN DEGRADATION

A column of 50 g. of ion exchange resin (Amberlite IRA-400) was washed with 10% sodium hydroxide solution until the eluates tested free of halogen, and then washed with water until the eluates tested free of base. A solution of 8.2 g. of 1-methyl-4-(3-tropanyl)-1,2,4,5-tetrahydro-1,4-benzodiazepine bismethiodide in 500 ml. of water was passed through the column. The column was washed with 1 liter of deionized water until the eluate tested neutral. The total eluate was concentrated to dryness in vacuo, the residue was dissolved in aqueous methanol, and the solution was distilled at atmospheric pressure until all of the methanol had been removed. The residue was distilled in vacuo (about 1 mm.). The distillate was treated with alcoholic picric acid, and the picrate which formed was recrystallized from ethanol, giving a sample with the M.P. 193–194° C. (dec.).

*Analysis.*—Calcd. for the dipicrate of 1-[(2-dimethylaminobenzyl)vinylamino] - 3 - dimethylamino - 5 - cycloheptene; $C_{20}H_{31}N_3 \cdot 2C_6H_3N_3O_7$: C, 50.21; H, 4.60; N, 5.32. Found: C, 49.8; H, 4.83; N, 5.44.

1 - methyl - 4 - (3 - tropanyl) - 1,2,4,5 - tetrahydro - 1,4-benzodiazepine bisethiodide was prepared from 11.6 g. of the free base and 14 g. of ethyl iodide in 100 ml. of ethanol. The bisethiodide had the M.P. 208–210° C.

*Analysis.*—Calcd. for $C_{22}H_{37}I_2N_3$: I, 42.5; N, 7.03. Found: I, 42.8; N, 7.12.

Example 2

(*a*) 3 - (2 - phenylethylaminoethylamino)tropane [I; Y is NH, *n* is 2, *m* is 1, R is $CH_3$, N=B is $$N(C_2H_5)(C_6H_5)]$$

was prepared from 51.9 g. of N-ethyl-N-phenylethylenediamine [B.P. 97–99° C. (0.2 mm.), $n_D^{25}=1.5625$, prepared by condensation of N-(2-bromoethyl)-phthalimide and N-ethylaniline] and 48.5 g. of 3-tropanone according to the manipulative procedure described in Example 1, part (*a*). There was thus obtained 78 g. of 3-(2-phenylethylaminoethylamino)tropane, B.P. 174–177° C. (0.6 mm.).

(*b*) 1 - ethyl - 4 - (3 - tropanyl) - 1,2,4,5 - tetrahydro - 1,4-benzodiazepine [IV; R' is $C_2H_5$, *m* is 1, R is $CH_3$, R" is H] was prepared from 31.2 g. of 3-(2-phenylethylaminoethylamino)tropane [part (*a*) above], 28.1 ml. of formic acid and 10.9 ml. of 37% formaldehyde according to the manipulative procedure described in Example 1, part (*b*). The product was distilled giving 17.6 g. of 1 - ethyl - 4 - (3 - tropanyl) - 1,2,4,5 - tetrahydro - 1,4 - benzodiazepine, B.P. 174–178° C. (0.5 mm.).

(*c*) 1 - ethyl - 4 - (3 - tropanyl) - 1,2,4,5 - tetrahydro - 1,4-benzodiazepine bismethiodide was prepared from 15.5 g. of 1-ethyl-4-(3-tropanyl)-1,2,4,5-tetrahydro-1,4-benzodiazepine and 16 g. of methyl iodide in 75 ml. of ethanol. The total crystalline product was leached with ethanol and the undissolved portion was recrystallized from water, giving 2 g. of 1-ethyl-4-(3-tropanyl)-1,2,4,5-tetrahydro-1,4-benzodiazepine bismethiodide, M.P. 269–271° C.

*Analysis.*—Calcd. for $C_{21}H_{35}N_3I_2$: N, 7.20; I, 43.51. Found: N, 7.22; I, 43.2.

1 - ethyl - 4 - (3 - tropanyl) - 1,2,4,5 - tetrahydro - 1,4-benzodiazepine bismethiodide was found to be about 3.5 and 1.5 times as effective as hexamethonium bromide in blockade of the parasympathetic and sympathetic ganglia, respectively, as measured by the carotid occlusion test in dogs.

Example 3

1 - ethyl - 4 - (3 - tropanyl) - 1,2,4,5 - tetrahydro - 1,4-benzodiazepine 8-methiodide.

The ethanol soluble portion from the preparation of the bismethiodide in Example 2, part (*c*) was concentrated and the residue was recrystallized from ethanol, giving 6.0 g. of 1-ethyl-4-(3-tropanyl)-1,2,4,5-tetrahydro-1,4-benzodiazepine 8-methiodide, M.P. 235–238° C.

*Analysis.*—Calcd. for $C_{20}H_{32}IN_3$: N, 9.52; I, 28.6. Found: N, 9.51; I, 28.6.

Example 4

1 - ethyl - 4 - (3 - tropanyl) - 1,2,4,5 - tetrahydro - 1,4-benzodiazepine bismethobromide was prepared from 20 g. of 1-ethyl-4-(3-tropanyl)-1,2,4,5-tetrahydro-1,4-benzodiazepine and an excess (20 g.) of methyl bromide in 80 ml. of methanol. The product which separated (9.5 g.) was collected by filtration and recrystallized from aqueous methanol, giving 1-ethyl-4-(3-tropanyl)-1,2,4,5-tetrahydro-1,4-benzodiazepine bismethobromide, M.P. 262–262.5° C. (dec.).

*Analysis.*—Calcd. for $C_{21}H_{35}Br_2N_3$: N, 8.58; Br, 32.6. Found: N, 8.58; Br, 32.4.

Example 5

1 - ethyl - 4 - (3 - tropanyl) - 1,2,4,5 - tetrahydro - 1,4-benzodiazepine bisethiodide.

A solution of 3 g. of 1-ethyl-4-(3-tropanyl)-1,2,4,5-tetrahydro-1,4-benzodiazepine in 10 ml. of acetonitrile was treated with 3 ml. of ethyl iodide. The crystalline material which separated was collected by filtration and recrystallized from water, giving 1-ethyl-4-(3-tropanyl)-1,2,4,5-tetrahydro-1,4-benzodiazepine bisethiodide, M.P. 253–254° C. (dec.).

*Analysis.*—Calcd. for $C_{23}H_{39}I_2N_3$: N, 6.89; I, 41.6. Found: N, 6.83; I, 41.2.

Example 6

(*a*) 3 - [2 - (p - tolyl)methylaminoethylamino]tropane [I; Y is NH, *n* is 2, *m* is 1, R is $CH_3$, N=B is $$N(CH_3)(p-CH_3C_6H_4)]$$

was prepared from 125.1 g. of N-methyl-N-(p-tolyl)ethylenediamine and 117 g. of 3-tropanone according to the manipulative procedure described above in Example 1, part (*a*). There was thus obtained a product boiling at 169–190° C. (0.2 mm.) which was redistilled to give 134 g. of 3-[2-(p-tolyl)methylaminoethylamino]tropane, B.P. 164–173° C. (0.3 mm.), $n_D^{23.5}=1.5532$.

*Analysis.*—Calcd. for $C_{18}H_{29}N_3$:N, 14.62. Found: N, 14.40.

(*b*) 1,7 - dimethyl - 4 - (3 - tropanyl) - 1,2,4,5 - tetrahydro-1,4-benzodiazepine [IV; R' is $CH_3$, *m* is 1, R is $CH_3$, R" is 7-$CH_3$] was prepared from 28.7 g. of 3-[2-(p-tolyl)methylaminoethylamino]-tropane, 25.9 ml. of 100% formic acid and 10 ml. of 37% formaldehyde according to the manipulative procedure described above in Example 1, part (*b*). There was thus obtained 19.3 g. of 1,7-dimethyl - 4 - (3 - tropanyl) - 1,2,4,5 - tetrahydro - 1,4-benzodiazepine, B.P. 163° C. (0.2 mm.). The picrate was obtained by dissolving the compound in absolute ethanol and adding alcoholic picric acid. The picrate was recrystallized from aqueous dimethylformamide and had the M.P. 230–231° C.

(*c*) 1,7 - dimethyl - 4 - (3 - tropanyl) - 1,2,4,5 -tetrahydro-1,4-benzodiazepine methiodide was prepared from a solution of 17.2 g. of 1,7-dimethyl-4-(3-tropanyl) - 1,2,4,5-tetrahydro-1,4-benzodiazepine and 18 g. of methyl iodide in 150 ml. of anhydrous methanol. The crystalline product which separated was leached twice with hot ethanol, and the undissolved material was recrystallized twice from ethanol, giving 1,7-dimethyl-4 - (3 - tropanyl) - 1,2,4,5- tetrahydro - 1,4 - benzodiazepine methiodide, M.P. 274–276° C.

*Analysis.*—Calcd. for $C_{20}H_{32}N_3I$: N, 9.50; I, 28.8. Found: N, 9.34; I, 28.3.

Example 7

(*a*) 3 - [2 - (p- methoxyphenyl)methylaminoethylamino]tropane [I; Y is NH, *n* is 2, *m* is 1, R is $CH_3$, N=B is $N(CH_3)(p-CH_3OC_6H_4)$] was prepared from 63 g. of N-methyl-N-(p-methoxyphenyl)ethylenediamine and 53.9 g. of 3-tropanone according to the manipulative procedure described above in Example 1, part (*a*). There was thus obtained 61.7 g. of 3-[2-(p-methoxyphenyl)methylaminoethylamino]tropane, B.P. 179–183° C. (0.5 mm.), $n_D^{24}=1.5560$.

(*b*) 1 - methyl - 4 - (3 - tropanyl) - 7 - methoxy - 1, 2,4,5-tetrahydro-1,4-benzodiazepine [IV; R' is $CH_3$, *m* is 1, R is $CH_3$, R" is 7-$CH_3O$] was prepared from 30.3 g. of 3-[2-(p-methoxyphenyl)methylaminoethylamino]-tropane, 25.9 ml. of 100% formic acid and 10 ml. of 37% formaldehyde according to the manipulative procedure described above in Example 1, part (*b*). There was thus obtained 25 g. of product, B.P. 183–196° C. (0.1–0.5 mm.) which was redistilled, giving 19.3 g. of 1 - methyl - 4 - (3 - tropanyl) - 7 - methoxy- 1,2,4,5 - tetrahydro-1,4-benzodiazepine, B.P. 180–185° C. (0.1 mm.). The picrate had the M.P. 239–240° C. when recrystallized from aqueous dimethylformamide.

Example 8

(*a*) 8 - (2 - chlorobenzyl)nortropanone was prepared from 40 g. of 2,5-diethoxytetrahydrofuran, 50 g. of ethyl acetonedicarboxylate and 44.5 g. of 2-chlorobenzylamine hydrochloride according to the manipulative procedure described below in Example 10, part (*a*).

The crude hydrochloride salt (29.7 g.) separated directly and was recrystallized from water, giving 8-(2-chlorobenzyl)nortropanone hydrochloride, M.P. 211–213° C. (dec.).

(b) 1 - ethyl - 4 - [8 - (2 - chlorobenzyl) - 3 - nortropanyl]-1,2,4,5-tetrahydro-1,4-benzodiazepine [IV; R' is $C_2H_5$, m is 1, R is 2-$ClC_6H_4CH_2$, R" is H].

8 - (2 - chlorobenzyl)nortropanone [part (a) above] reacts with 2-phenylethylaminoethylamine according to the manipulative procedure described above in Example 1, part (a) to give 3-(2-phenylethylaminoethylamino)-8-(2-chlorobenzyl)nortropane [I; Y is NH, n is 2, m is 1, R is 2-$ClC_6H_4CH_2$, N=B is $N(C_2H_5)(C_6H_5)$]. The latter can be reacted with formic acid and formaldehyde according to the manipulative procedure of Example 1, part (b) to give 1-ethyl-4-[8-(2-chlorobenzyl)-3-nortropanyl]-1,2,4,5-tetrahydro-1,4-benzodiazepine.

*Example 9*

3 - (2 - phenylmethylaminoethylamino) - 9 - methylgranatanine [I; Y is NH, n is 2, m is 2, R is $CH_3$, N=B is $N(C_2H_5)(C_6H_5)$].

A mixture of 35 g. of 2-phenylethylaminoethylamine, 32 g. of pseudopelletierine, 1 g. of zinc chloride and 200 ml. of toluene was refluxed for about fifteen hours using a water separator to collect the water formed in the reaction. The reaction mixture was cooled, washed with 150 ml. of 10% sodium hydroxide solution and extracted with ether. The ether extracts were washed with 40% ammonium sulfate solution, dried over anhydrous potassium carbonate and concentrated. Absolute alcohol was added to the residue and the solution was again concentrated to dryness in vacuo. The residue (69 g.) containing 3 - (2 - phenylethylaminoethylimino) - 9-methylgranatanine was dissolved in 200 ml. of absolute alcohol and hydrogenated in the presence of 1 g. of platinum oxide catalyst at an initial pressure of 50 lbs. per sq. inch. After reduction was complete, the catalyst was removed by filtration, the filtrate was concentrated and the residue distilled in vacuo, giving 43.4 g. of product which was redistilled, giving 37.7 g. of 3-(2-phenylmethylaminoethylamino) - 9 - methylgranatanine, B.P. 160–184° C. (0.2–0.9 mm.), $n_D^{30}$=1.5575.

3 - (2 - phenylmethylaminoethylamino) - 9 - methylgranatanine when heated with formaldehyde and formic acid gives 1 - ethyl - 4 - (9-methyl-3-granatanyl)-1,2,4,5-tetrahydro-1,4-benzodiazepine [IV; R' is $CH_3$, m is 2, R is $CH_3$, R" is H].

*Example 10*

(a) 8-benzylnortropanone.

2,5-diethoxytetrahydrofuran (160 g.) was suspended in 150 ml. of water and 0.13 ml. of concentrated hydrochloric acid was added. The suspension was stirred at 48–50° C. for two hours, cooled to 25° C., and 202 g. of ethyl acetonedicarboxylate was added followed by 100 ml. of water and benzylamine hydrochloride prepared from 107 g. of benzylamine and 83 ml. of concentrated hydrochloric acid. The reaction mixture was stirred overnight, treated with 250 ml. of hydrochloric acid, and heated and stirred during which time water was slowly distilled off. After five and one-half hours 270 ml. of water had been distilled off, the temperature had risen from 90 to 103° C., and the reaction mixture was then filtered, the filtrate was made basic with 250 ml. of 35% sodium hydroxide, 500 g. of potassium carbonate was added and the mixture was extracted three times with ether. The ether extracts were dried over anhydrous calcium sulfate, concentrated, and the residue distilled. The fraction boiling at 146–153° C. (0.8 mm.) (102 g.) was redistilled, giving 8-benzylnortropanone, B.P. 134–137° C. (0.4 mm.), $n_D^{25}$ =1.5526.

(b) 3 - (2 - phenylethylaminoethylamino) - 8 -benzylnortropane [I; Y is NH, n is 2, m is 1, R is $C_6H_5CH_2$, N=B is $N(C_2H_5)(C_6H_5)$] can be prepared from N-ethyl-N-phenylethylenediamine and 8-benzylnortropanone according to the manipulative procedure given above in Example 1, part (a).

(c) 1 - ethyl - 4 - (8 - benzyl - 3 - nortropanyl) - 1,2,4,5 - tetrahydro-1,4-benzodiazepine [IV; R' is $C_2H_5$, m is 1, R is $C_6H_4CH_2$, R" is H] can be prepared by heating 3-(2-phenylethylaminoethylamino) - 8 - benzylnortropane with formic acid and formaldehyde according to the manipulative procedure given above in Example 1, part (b).

*Example 11*

(a) 8-(4-methoxybenzyl)nortropanone was prepared from 32 g. of 3,5-diethoxytetrahydrofuran, 40.5 ml. of ethyl acetonedicarboxylate and 27.4 g. of p-methoxybenzylamine according to the manipulative procedure given above in Example 10, part (a). The product boiling at 162–180° C. (0.1 mm.) was collected and redistilled, giving 8-(4-methoxybenzyl)nortropanone, B.P. 179–184° C. (0.1 mm.), $n_D^{25}$=1.5538. The latter base was converted to the hydrochloride salt by adding an excess of 4 N ethanolic hydrogen chloride. The hydrochloride salt had the M.P. 203–204° C. (dec.) when recrystallized from ethanol.

(b) 3-(2-phenylethylaminoethylamino)-8-(4-methoxybenzyl)nortropane [I; Y is NH, n is 2, m is 1, R is 4-$CH_3OC_6H_4CH_2$, N=B is $N(C_2H_5)(C_6H_5)$] can be prepared from N-ethyl-N-phenylethylenediamine and 8-(4-methoxybenzyl)nortropanone according to the manipulative procedure given above in Example 1, part (a).

(c) 1-ethyl-4-[8-(4 - methoxybenzyl) - 3-nortropanyl]-1,2,4,5-tetrahydro-1,4-benzodiazepine [IV; R' is $C_2H_5$, m is 1, R is 4-$CH_3OC_6H_4CH_2$, R" is H] can be prepared by heating 3-(2-phenylethylaminoethylamino)-8-(4-methoxybenzyl)nortropane with formic acid and formaldehyde according to the manipulative procedure given above in Example 1, part (b).

*Example 12*

(a) 8-(2,3-dimethoxybenzyl)nortropanone was prepared from 40 g. of 2,5-diethoxytetrahydrofuran, 50 g. of ethyl acetonedicarboxylate and 42 g. of 2,3-dimethoxybenzylamine according to the manipulative procedure given above in Example 10, part (a). There was thus obtained 28.5 g. of 8-(2,3-dimethoxybenzyl)nortropanone, B.P. 178–199° C. (0.5 mm.), which was converted to its hydrochloride salt, M.P. 201–202° C. (dec.).

(b) 3-(2-phenylethylaminoethylamino)-8-(2,3 - dimethoxybenzyl)nortropane [I; Y is NH, n is 2, m is 1, R is 2,3-$(CH_3O)_2C_6H_3CH_2$, N=B is $N(C_2H_5)(C_6H_5)$] can be prepared from N-ethyl-N-phenylethylenediamine and 8-(2,3-dimethoxybenzyl)nortropanone according to the manipulative procedure given above in Example 1, part (a).

(c) 1-ethyl-4-[8-(2,3-dimethoxybenzyl) - 3 - nortropanyl]-1,2,4,5-tetrahydro-1,4-benzodiazepine [IV; R' is $C_2H_5$, m is 1, R is 2,3-$(CH_3O)_2C_6H_3CH_2$, R" is H] can be prepared by heating 3-(2-phenylethylaminoethylamino)-8-(2,3-dimethoxybenzyl)nortropane with formic acid and formaldehyde according to the manipulative procedure given above in Example 1, part (b).

*Example 13*

(a) 8-phenylnortropanone.

A solution was prepared from 36.2 g. of 2,5-diethoxytetrahydrofuran in 240 ml. of water containing 0.6 ml. of concentrated sulfuric acid. A second solution was prepared from 97 g. of acetonedicarboxylic acid, 146 g. of sodium acetate trihydrate and 27 g. of aniline in 3.5 liters of water. The first solution was warmed on a steam bath for fifteen minutes, cooled and added to the second solution. The reaction mixture was kept overnight, and the solid which separated was collected by filtration and dissolved in 1 liter of 5% hydrochloric acid at 60° C. The solution was cooled, made basic with ammonia and the product collected by filtration and recrystallized from dilute methanol, giving 11.4 g. of 8-phenylnortropanone, M.P. 107–109° C.

(b) 3-(2-phenylethylaminoethylamino)-8-phenylnortropane [I; Y is NH, n is 2, m is 1, R is C₆H₅, N=B is N(C₂H₅)(C₆H₅)] can be prepared from N-ethyl-N-phenylethylenediamine and 8-phenylnortropanone according to the manipulative procedure given above in Example 1, part (a).

(c) 1-ethyl-4-(8-phenyl-3-nortropanyl)-1,2,4,5-tetrahydro-1,4-benzodiazepine [IV; R' is C₂H₅, m is 1, R is C₆H₅, R'' is H] can be prepared by heating 3-(2-phenylethylaminoethylamino)-8-phenylnortropane with formic acid and formaldehyde according to the manipulative procedure given above in Example 1, part (b).

Pharmacological evaluation of the compounds of the preceding examples by the standard carotid occlusion response in dogs and the nictitating membrane response in cats has shown that these substances and their obvious equivalents within the scope of Formula IV have ganglionic blocking effects and indicates their usefulness in the field of reducing hypertension. The quaternary ammonium salts possess activities and toxicities of the same order of magnitude as those of standard ganglionic blocking agents such as hexamethonium. The compounds of the invention are prepared for use by dissolving them under sterile conditions in water, or in a physiologically compatible aqueous medium such as saline, and stored in ampules for parenteral administration. Alternatively, they can be incorporated with excipients in tablet or capsule form for oral administration.

This application is a continuation-in-part of my copending application, Serial No. 483,808, filed January 24, 1955, now U.S. Patent 2,845,427, which application is a continuation-in-part of my copending application, Serial No. 451,963, filed August 24, 1954, now U.S. Patent 2,836,598, this last case in turn being a continuation-in-part of my application, Serial No. 380,884, filed September 17, 1953, copending with Serial No. 451,963, but now abandoned.

I claim:

1. A cycloalkane having a 1,5-imino bridge, a hydrocarbon radical having from one to about ten carbon atoms attached to the imino nitrogen, and a 1-lower-alkyl-1,2,4,5-tetrahydro-1,4-benzodiazepine radical attached to the 3-position of the cycloalkane ring through the nitrogen atom in the 4-position of the diazepine ring, wherein said cycloalkane is a member of the group consisting of cycloheptane and cyclooctane.

2. A member of the group consisting of lower-alkyl, lower-alkenyl, and lower-aralkyl quaternary ammonium salts of compounds having the formula

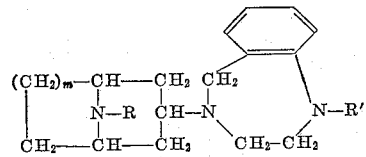

wherein R and R' are lower-alkyl groups and m is an integer from 1 to 2, said salt having an anion which does not substantially increase the toxicity of the compound as a whole to animal organisms.

3. A lower-alkyl quaternary ammonium salt of a compound having the formula

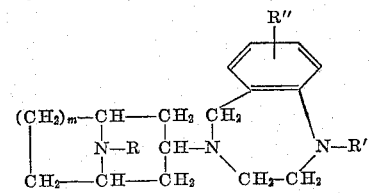

wherein R, R' and R'' are lower-alkyl groups and m is 1, said salt having an anion which does not substantially increase the toxicity of the compound as a whole to animal organisms.

4. A lower-alkyl quaternary ammonium salt of a compound having the formula

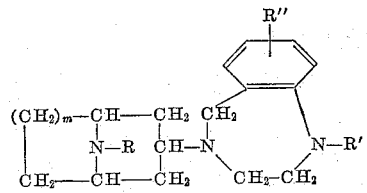

wherein R and R' are lower-alkyl groups, m is 1, and R'' is a lower-alkoxy group, said salt having an anion which does not substantially increase the toxicity of the compound as a whole to animal organisms.

5. A lower-alkyl quaternary ammonium salt of 1-methyl-4-(3-tropanyl)-1,2,4,5-tetrahydro-1,4-benzodiazepine, said salt having an anion which does not substantially increase the toxicity of the compound as a whole to animal organisms.

6. A lower-alkyl quaternary ammonium salt of 1-ethyl-4-(3-tropanyl)-1,2,4,5-tetrahydro-1,4-benzodiazepine, said salt having an anion which does not substantially increase the toxicity of the compound as a whole to animal organisms.

7. A lower-alkyl quaternary ammonium salt of 1,7-dimethyl-4-(3-tropanyl)-1,2,4,5-tetrahydro-1,4-benzodiazepine, said salt having an anion which does not substantially increase the toxicity of the compound as a whole to animal organisms.

8. A lower-alkyl quaternary ammonium salt of 1-methyl-4-(3-tropanyl)-7-methoxy-1,2,4,5-tetrahydro-1,4-benzodiazepine, said salt having an anion which does not substantially increase the toxicity of the compound as a whole to animal organisms.

9. The process for preparing a cycloalkane having a 1,5-imino bridge, a hydrocarbon radical having from one to about ten carbon atoms attached to the imino nitrogen, and a 1-lower-alkyl-1,2,4,5-tetrahydro-1,4-benzodiazepine radical attached to the 3-position of the cycloalkane ring through the nitrogen atom in the 4-position of the diazepine ring, wherein said cycloalkane is a member of the group consisting of cycloheptane and cyclooctane, which comprises heating a cycloalkane selected from cycloheptane and cyclooctane having a 1,5-imino bridge, a hydrocarbon radical having from one to about ten carbon atoms attached to the imino nitrogen, and a 2-(monocarbocyclic aryl-lower-alkylamino)ethylamino group attached to the 3-position of the cycloalkane ring with formic acid and formaldehyde.

10. The process for preparing a member of the group consisting of lower-alkyl, lower-alkenyl, and lower-aralkyl quaternary ammonium salts of cycloalkanes having a 1,5-imino bridge, a hydrocarbon radical having from one to about ten carbon atoms attached to the imino nitrogen, and a 1-lower-alkyl-1,2,4,5-tetrahydro-1,4-benzodiazepine radical attached to the 3-position of the cycloalkane ring through the nitrogen atom in the 4-position of the diazepine ring, wherein said cycloalkane is a member of the group consisting of cycloheptane and cyclooctane, which comprises reacting said 1,5-iminocycloalkane with a compound of the formula R'''X'' wherein R''' is a hydrocarbon radical having from one to about ten carbon atoms and X'' is the anion of a strong acid.

11. A lower-alkyl quaternary ammonium salt of a compound having the formula

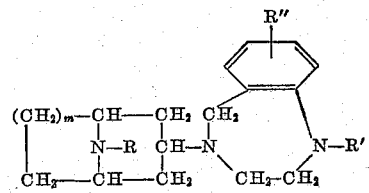

wherein R, R' and R" are lower-alkyl groups and $m$ is 2, said salt having an anion which does not substantially increase the toxicity of the compound as a whole to animal organisms.

12. A lower-alkyl quaternary ammonium salt of a compound having the formula

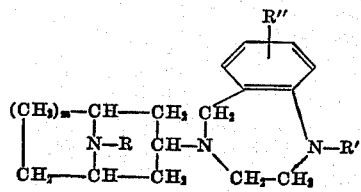

wherein R and R' are lower-alkyl groups, $m$ is 2, and R" is a lower-alkoxy group, said salt having an anion which does not substantially increase the toxicity of the compound as a whole to animal organisms.

13. A lower-alkohalide salt of 1-methyl-4-(3-tropanyl)-1,2,4,5-tetrahydro-1,4-benzodiazepine.

14. A lower-alkohalide salt of 1-ethyl-4-(3-tropanyl)-1,2,4,5-tetrahydro-1,4-benzodiazepine.

15. A lower-alkohalide salt of 1,7-dimethyl-4-(3-tropanyl)-1,2,4,5-tetrahydro-1,4-benzodiazepine.

16. A lower-alkohalide salt of 1-methyl-4-(3-tropanyl)-7-methoxy-1,2,4,5-tetrahydro-1,4-benzodiazepine.

No references cited.

UNITED STATES PATENT OFFICE
CERTIFICATE OF CORRECTION

Patent No. 2,902,490                                          September 1, 1959

Sydney Archer

It is hereby certified that error appears in the printed specification of the above numbered patent requiring correction and that the said Letters Patent should read as corrected below.

Column 3, line 64, for "reuction," read -- reduction, --; column 11, line 36, strike out "2,836,598, this last case in turn being a continuation-in-" and insert the same after "now U. S. Patent" in line 37, same column --.

Signed and sealed this 1st day of March 1960.

(SEAL)
Attest:

KARL H. AXLINE                                        ROBERT C. WATSON
Attesting Officer                                      Commissioner of Patents